(12) United States Patent
van Diggelen et al.

(10) Patent No.: US 8,571,147 B2
(45) Date of Patent: Oct. 29, 2013

(54) METHOD AND APPARATUS FOR REDUCING THE TIME REQUIRED TO ACQUIRE A GPS SIGNAL

(75) Inventors: Frank van Diggelen, San Jose, CA (US); Charles Abraham, Los Gatos, CA (US)

(73) Assignee: Global Locate, Inc., San Jose, CA (US)

( * ) Notice: Subject to any disclaimer, the term of this patent is extended or adjusted under 35 U.S.C. 154(b) by 1072 days.

(21) Appl. No.: 12/544,600

(22) Filed: Aug. 20, 2009

(65) Prior Publication Data

US 2009/0304051 A1 Dec. 10, 2009

Related U.S. Application Data

(63) Continuation of application No. 10/441,246, filed on May 19, 2003, now Pat. No. 7,672,404.

(51) Int. Cl.
*H04L 27/06* (2006.01)
(52) U.S. Cl.
USPC .......................................................... 375/343

(58) Field of Classification Search
USPC ......... 375/130, 140, 142, 145, 147, 149, 150, 375/316, 343, 354, 355; 342/352, 357.2, 342/357.22, 357.23, 357.24, 357.34, 342/357.42, 357.43, 357.44
See application file for complete search history.

(56) References Cited

U.S. PATENT DOCUMENTS

| | | | | |
|---|---|---|---|---|
| 6,133,874 A | * | 10/2000 | Krasner ................... | 342/357.63 |
| 2001/0014116 A1 | * | 8/2001 | Saito et al. .................... | 375/148 |
| 2002/0181556 A1 | * | 12/2002 | Sakuma ........................ | 375/147 |
| 2003/0086512 A1 | * | 5/2003 | Rick et al. ..................... | 375/343 |
| 2003/0219066 A1 | * | 11/2003 | Abraham et al. ............. | 375/150 |

* cited by examiner

*Primary Examiner* — Tesfaldet Bocure
(74) *Attorney, Agent, or Firm* — Sterne, Kessler, Goldstein & Fox P.L.L.C.

(57) ABSTRACT

A method of correlating a digital communications signal is described. In an example, a window is defined equal to a portion of an epoch of the digital communication signal. The digital communication signal is then correlated across the window. A determination is made as to whether a correlation peak results from the correlating. Timing parameters are then established for receiving additional digital communication signals in response to presence of the correlation peak.

21 Claims, 4 Drawing Sheets

METHOD AND APPARATUS FOR REDUCING THE TIME REQUIRED TO ACQUIRE A GPS SIGNAL

BACKGROUND OF THE INVENTION

1. Field of Invention

The present invention relates to digital signal correlation techniques. In particular, the present invention relates to a method and apparatus for reducing the time required to acquire a Global Position System ("GPS") signal.

2. Description of the Background Art

The process of measuring a global positioning system (GPS) signal begins with a procedure to search for the GPS signal in the presence of noise by attempting a series of correlations of the incoming signal against a known pseudorandom noise (PRN) code. The search process can be lengthy, as both the frequency of the signal and the time-of-arrival delay are unknown. To find the signal, receivers traditionally conduct a two dimensional search, checking each delay possibility at a variety of possible frequencies. To test for the presence of a signal at a particular frequency and delay, the receiver is tuned to the frequency, and the incoming signal is correlated with the known PRN code delayed by an amount corresponding to an estimated time of arrival. If no signal is detected, the search continues to the next delay possibility, and after all delay possibilities are checked, continues to the next frequency possibility. Each individual correlation is performed over one or more milliseconds in order to allow sufficient signal averaging to distinguish the signal from the noise. Because many thousands of frequency and delay possibilities are tested, the overall acquisition process can take tens of seconds. This search technique is repeated for the signal from each satellite needed to calculate a position and time result, e.g., five satellite signals.

In an effort to reduce the search time required to achieve a position location solution, various techniques have been explored that provide aiding information to the GPS receiver. The aiding information generally provides satellite ephemeris as well as an estimate of the receiver's position. The aiding information is generally coupled to the GPS receiver via a wireless network.

In U.S. Pat. No. 6,133,874, the GPS receiver acquires a GPS signal from a first GPS satellite using a conventional search technique as described above. A first pseudorange to the first GPS satellite is computed using this conventional technique. The GPS receiver then uses the aiding information (e.g., the satellite position, time of day and receiver approximate position) in combination with the first pseudorange to estimate the pseudorange to the next satellite. This combination of information enables the search range (time range) to be substantially reduced for each additional satellite signal. The signals from each satellite are sequentially processed in this manner until enough satellite signals are received to compute the position of the GPS receiver.

In U.S. Pat. No. 6,070,078, a GPS receiver obtains ephemeris information and a server calculates predicted PRN code shift positions based on a known location and the ephemeris data. A reduced functionality GPS receiver within a cellular telephone receives a time reference and then searches a limited number of PRN code shift positions for each of a plurality of GPS satellites based on the predicted PRN code shift positions. If a time reference is not transmitted to the reduced functionality GPS receiver, a PRN code shift position for a first satellite signal is measured by searching all possible PRN code shift positions. The measured PRN code shift position for the first satellite signal is then used to reduce the range of possible PRN code shift positions for remaining satellite signals.

The technique of U.S. Pat. No. 6,133,874 requires a pseudorange to be computed with respect to the first satellite. In a low signal to noise ratio environment, such a computation may require an excessive amount of time to achieve as many correlations as required to accurately compute the pseudorange. In addition, microprocessor time must be spent to compute the pseudorange. The technique of U.S. Pat. No. 6,070,078 requires a time reference to reduce the search range for GPS signals. If a time reference is unavailable, the technique of U.S. Pat. No. 6,070,078 requires all delay possibilities for a first satellite signal to be searched. Again, in a low signal to noise ratio environment, such a computation may require an excessive amount of time to search all delay possibilities in order to accurately acquire the first satellite signal.

Therefore, there is a need in the art for a method and apparatus that reduces the amount of time required to acquire GPS satellite signals.

SUMMARY OF THE INVENTION

The invention provides a method and apparatus for reducing the time required to acquire GPS satellite signals. The method defines a window equal a portion of a predefined time period, correlates the GPS signal across the window, and identifies whether a correlation peak results from the correlating. In one embodiment, the predefined time period is an epoch, and the window is a portion of the epoch. If a correlation peak is not found in the current window, then one or more additional windows are selected within the remaining portion of the predefined time period and searched for the correlation peak until the correlation peak is found. The time estimate used to determine the correlation is used to correlate GPS signals from other GPS satellites.

BRIEF DESCRIPTION OF DRAWINGS

So that the manner in which the above recited features of the invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE INVENTION

Figure 1:
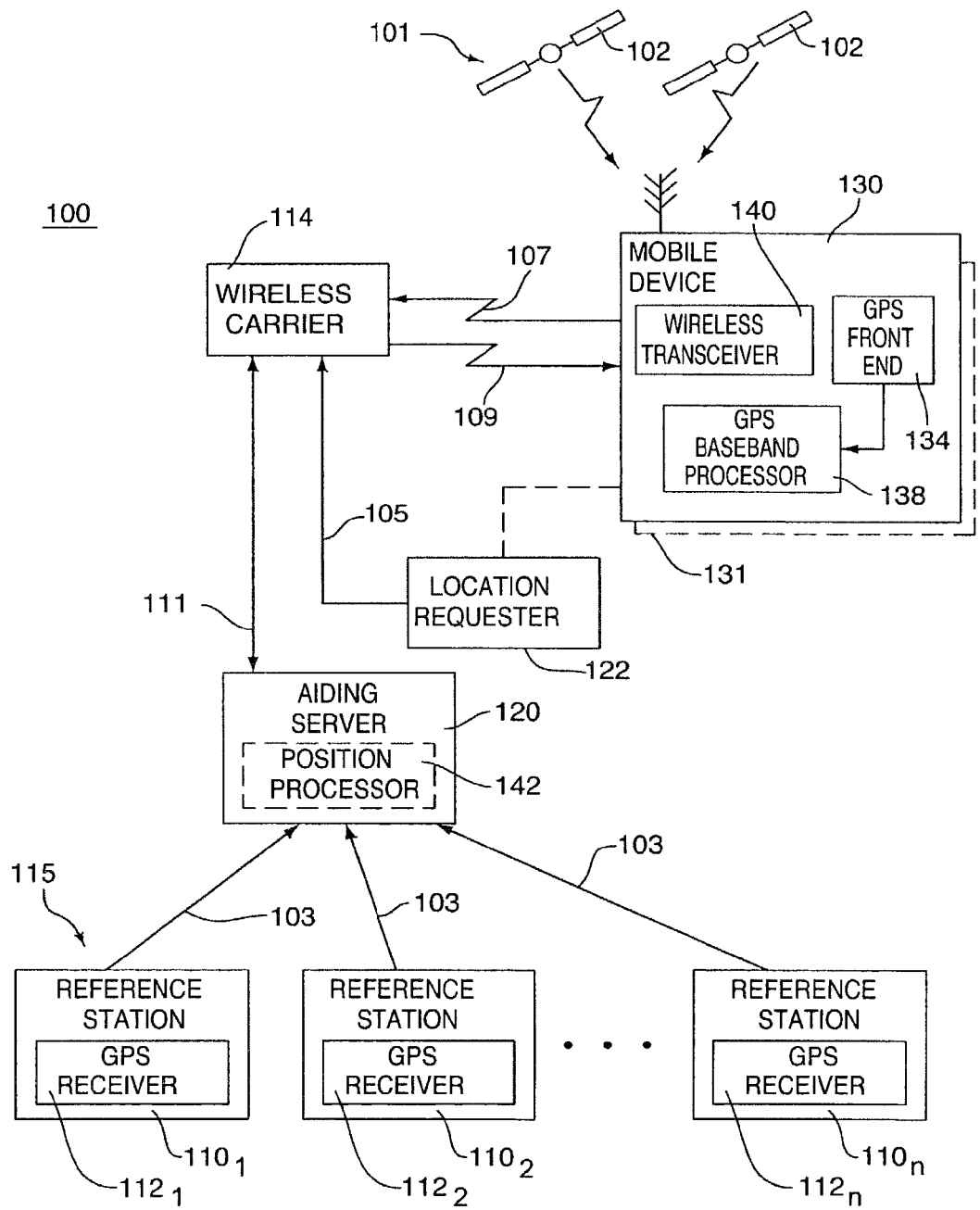
FIG. 1 depicts prior a block diagram of an object locating system.

FIG. 1 depicts a block diagram of a location system 100. The system 100 illustratively uses a Global Positioning System (GPS) 101 (or other similar satellite position location system) having a plurality of satellites 102 orbiting the earth. The system 100 comprises a reference station network 115 comprising a plurality of geographically dispersed reference stations where each reference station comprises fixed site GPS receivers $110_1$ through $110_n$ (collectively fixed site GPS receiver 110), an aiding server 120 with software that executes GPS signal processing algorithms 142, and at least one mobile device 130. The mobile device 130 is coupled to, or otherwise associated with, an object that is to be located, e.g., mobile object 131 including personal assets, equipment, persons and the like. The mobile device 130 communicates with the aiding server 120 via a wireless carrier 114 (e.g., a cellular telephone network). Each reference station 110 further comprises a conventional GPS receiver $112_1$ through $112_n$ (collectively conventional GPS receivers 112). For example, for a global network, the network may comprise just a few stations to observe all satellites at all times. Each of the conventional GPS receivers 112 is coupled to the aiding server 120 via a network communications link 103.

The aiding server 120 receives the satellite information from reference station network 115 and processes the information. The processed information generally contains ephemeris, long term satellite orbit data, or other satellite tracking data. Some or all of the processed information, known as aiding information, is coupled to the wireless carrier 114 for transmission to the mobile device 130.

The aiding server 120 provides the mobile device 130 with the aiding information such that the mobile device can compute its position. The mobile device 130 contains a wireless communications transceiver 140 that enables the receiver to communicate with the aiding server 120 through the wireless carrier 114. The wireless carrier communicates with the server through a conventional communication network 111.

As discussed below, the device 130 comprises a wireless transceiver 140, a GPS receiver front end 134, and a GPS signal processor 138. In one embodiment, the GPS signal processor 138 includes a parallel GPS signal correlator and associated software to perform various algorithms described below. One embodiment of such a correlator is described in co-pending U.S. patent application Ser. No. 09/861,086, filed May 18, 2001, which is incorporated by reference herein in its entirety.

In one embodiment, the mobile device 130 receives aiding information (e.g., aiding data that provides one or more of satellite ephemeris, the coefficients of a pseudorange model, Doppler information, and estimated position of the device 130) from the aiding server 120 through the wireless link 109, determines a position estimate for the mobile device 130, receives GPS satellite signals, and processes the GPS signals. The mobile device 130 uses the processed GPS signals and the aiding information to compute its location. In an alternative embodiment, the device 130 provides the processed GPS signals to the wireless carrier 114 which transmits the processed signals to the aiding server 120. The aiding server 120 uses an optional position processor 142 to further process the GPS signals from the device 130 to determine the device's location. A location requestor 122 can then request the receiver's location through a number of communications paths 105, e.g., dial up access, Internet access, wired land line and the like. The location requester can also be the user of the mobile device 130. In various embodiments described herein, the location can be displayed at the mobile device 130 and/or communicated through the wireless carrier 114 to the server 120.

Figure 2:
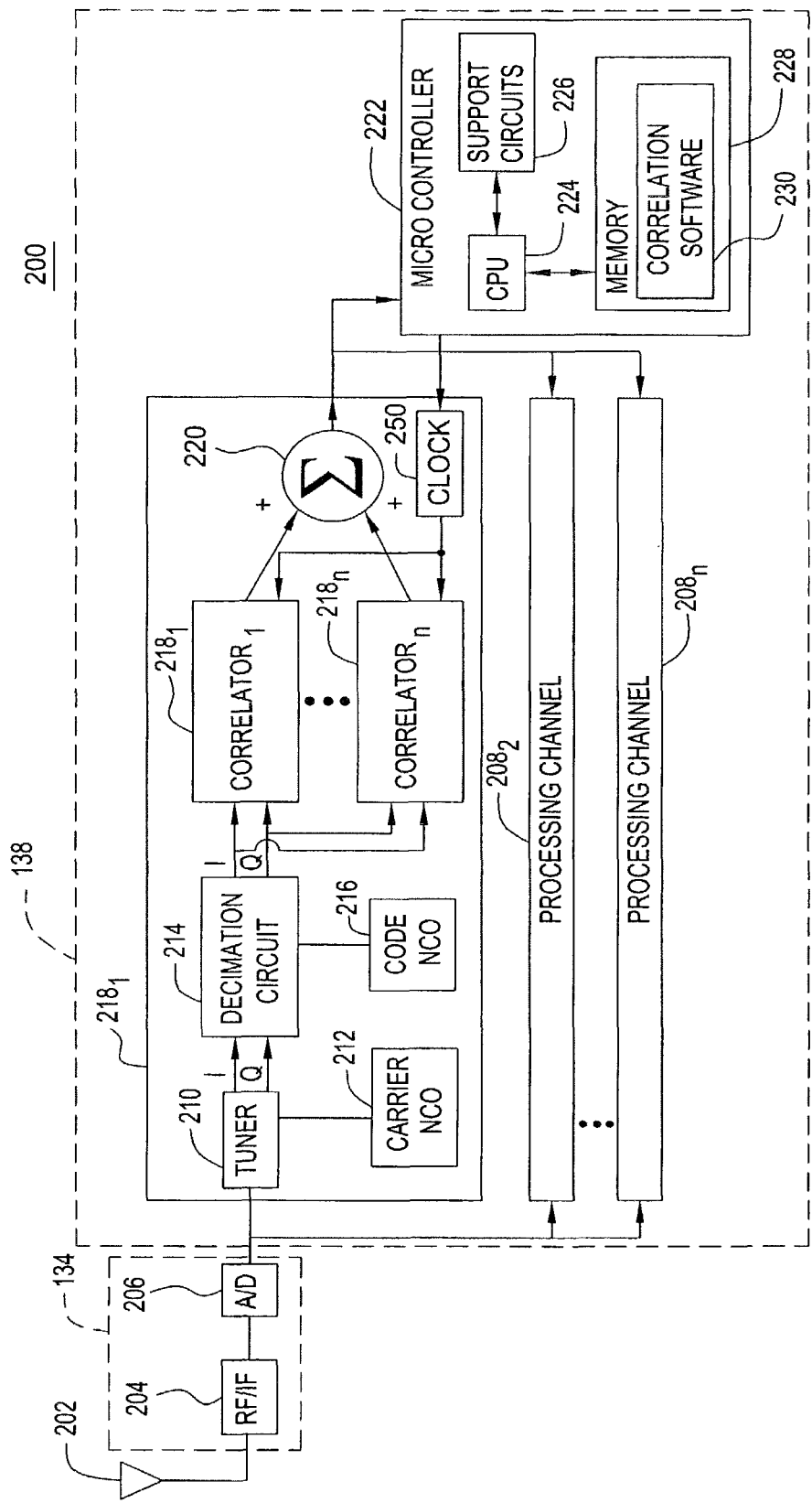
FIG. 2 depicts a block diagram of an embodiment of GPS circuitry used in accordance with the invention.

FIG. 2 depicts a block diagram of a global positioning system (GPS) receiver 200 incorporating the present invention. The use of a GPS receiver 200 as the platform within which the invention is incorporated forms one application of the invention. Other platforms that require signal correlation may find use for the present invention.

The receiver 200 comprises a GPS front end 134 and a GPS baseband processor 138. The GPS front end 134 comprises a radio-frequency to intermediate frequency (RF/IF) converter 204 and an analog-to-digital converter (A/D) 206. The front end 134 is coupled to an antenna 202 that is adapted to receive GPS signals from GPS satellites. The radio-frequency-to-intermediate-frequency converter (RF/IF converter) 204 filters, amplifies, and frequency shifts the signal for digitization by the analog-to-digital converter (A/D) 206. The elements 202, 204 and 206 are substantially similar to those elements used in conventional GPS or assisted GPS receivers.

The GPS baseband processor 138 comprises a plurality of processing channels 208 and a microcontroller 222. Each processing channel 208 comprises a tuner 210, a carrier numerically controlled oscillator (NCO) 212, a decimation circuit 214, a code NCO 216, a plurality of correlators 218, a clock 250, and a summer 220. The output of the A/D 206 is coupled to each of the processing channels $208_1$, $208_2$, ... $208_n$ (where n is an integer) implemented in digital logic. Each processing channel $208_n$ may be used to process the signal from a particular GPS satellite. The signal in a particular channel is tuned digitally by the tuner 210, driven by the carrier NCO 212. The tuner 210 serves two purposes. First, the IF frequency component remaining after RF/IF conversion is removed to produce a baseband or near-baseband signal. Second, the satellite Doppler frequency shift resulting from satellite motion, user motion, and reference frequency errors is removed. The output from the tuner is a baseband (or near baseband) signal consisting of an in-phase component (i) and a quadrature component (Q).

A decimation circuit 214 processes the output of the tuner 210. The output of the decimation circuit 214 is a series of complex signal samples with I and Q components, output at a rate precisely timed to match the timing of the input signal. In one embodiment of the invention, the decimation operation is a simple pre-summer that sums all the incoming signal samples over the period of an output sample. A numerically controlled oscillator (NCO) 216 is used to time the sampling process. For example, if two samples per chip of the C/A code is desired, the code NCO 216 is set to generate a frequency of $(2 \times f_s)$, where $f_s$ is $f_o$ (the GPS signal's C/A code chipping rate), adjusted for Doppler shift. The NCO 216 adjusts for Doppler shift based on external input from firmware commands. Because the Doppler shift is different for each satellite, a separate code NCO 216 and decimation circuit 214 is required for each channel $208_n$. It should be noted that there is no requirement that the incoming sample rate be an integer multiple of the $f_s$, as the code NCO 108 is capable of generating an arbitrary frequency. If the decimation circuit 214 is a pre-summer, the number of samples summed will typically toggle between two values, so that over the long term, the correct sample timing is maintained. For example, if the incoming sample rate is 10 MHz, and the desired sample rate is 2.046 MHz, the pre-summer will add either 4 or 5 samples, so that the desired sample rate is maintained on average.

The decimation circuit 214 may also include a quantizer (not shown) at its output to reduce the number of bits in the signal components before further processing. In one embodiment of the invention, 2-bit quantization is used.

The signal samples from decimation circuit 214 are coupled to correlators $218_1$-$218_n$ (hereinafter "correlators 218"). Each of correlators 218 is designed to produce a correlation between the input signal and a reference code (the PRN code). The reference code supplied to each of correlators 218 is shifted by one one-half "chip" of the GPS PRN code. As is well known in the art, the correlator 218 having the input signal and PRN code aligned will have a high correlation output, all the other correlators will have no output signal. The summer 220 sums all the outputs together such that if a high correlation occurs in any one of the correlators, an output signal will result from the summer 220. The output of the summer 220 is coupled to a microcontroller 222. The timing of the correlators 218 is controlled by a clock 250. The local clock timing adjustment is known as a local clock bias.

The PRN code used to form the GPS signal repeats every 1023 chips i.e., one epoch. In one embodiment, to accurately correlate the signal, the correlation is performed in ½ chip intervals, i.e., requiring 2046 delays. As such, if the entire code were to be correlated at once, 2046 correlators 218 would be required for each of the I and Q signals. However, power consumption and circuit size restrictions presently make a processor having 4092 correlators impractical. As such, the GPS baseband processor comprises less that 4092 correlators, e.g., 2046 correlators with 1023 correlators used for I signal processing and 1023 correlators used for Q signal processing. These 1023 correlators for each I and Q signal are operated in accordance with the invention to facilitate finding a high correlation result as described below.

The output of each processing channel 208 is coupled to the microprocessor 222 for processing the parallel correlation results of the 2046 correlators of each processing channel. The microprocessor 222 comprises a central processing unit (CPU) 224, support circuits 226, and a memory 228. The CPU 224 may be any form of microprocessor or microcontroller integrated circuit that is known in the art. The support circuits 226 are well known circuits for facilitating the operation of the CPU 224. The support circuits 226 include, for example, one or more of the following: a cache, power supplies, clock circuits, input/output circuits, and the like. The memory 228 may be one or more of random access memory, read only memory, flash memory, and the like. The memory 228 may be used for storing correlation results as well as for storing executable software such as the correlation software 230.

The correlation software 230 processes the correlation results, controls the timing of the code NCO 216, as well as the timing of the clock 250 that controls PRN code delay within the correlators 218. To facilitate full convolution of an epoch of GPS signal using less than the number of correlators available to perform the full convolution, the correlation software must repeatedly utilize the correlators in a sequential manner to compute a full convolution. However, a full convolution may not be necessary since a partial correlation result may be used for timing synchronization. For example, if enough correlators are available to correlate signals in a half of an epoch, then the correlation software 230 will delay the PRN code for 0 through 1023 half chips and perform a correlation. If no signal is found then the PRN code will be delayed 1024 through 2046 half chips and the correlation will be processed a second time. The correlation will result in either the first half of an epoch, the second half of an epoch, or not at all in some instances when no GPS signal is available. Once the delay is found that results in the correlation occurring either in the first half epoch or the second half epoch, the timing of the PRN code can be adjusted thereafter such that a correlation peak occurs for each epoch of GPS signal received. Once a correlation peak is found in channel 208, then the timing parameters (e.g., which half epoch resulted in the correlation peak) can be used to determine a timing parameter estimate (e.g., an estimate of clock bias within the clock 250) for the other channels 208₂ . . . 208ₙ. As such, the aiding information is used in combination with the timing parameters of channel 208₁ to reduce the search range for the other satellite signals. Using this method of deriving the timing synchronization for the GPS receiver allows for timing synchronization without computing an accurate pseudorange to the satellite.

In one embodiment of the invention, the correlators 218 during the signal acquisition process used by channel 208₁ may accumulate correlation results for multiple epochs of the GPS signal, which repeats at nominal 1 millisecond intervals. For example, if 10 milliseconds of the signal are processed, the output values are the sum of 10 correlation results each generated over one epoch. All the individual correlations should have a similar characteristic, since the timing of the decimation operation ensures that samples are taken at the same relative moment within each epoch. Accumulating similar results from individual correlations improves the signal to noise ratio, enhancing the ability of the receiver to detect weak signals. This processing may be referred to as coherent integration and can be combined with magnitude integration to yield correlation results averaged over a time period of up to several seconds.

Figure 3:
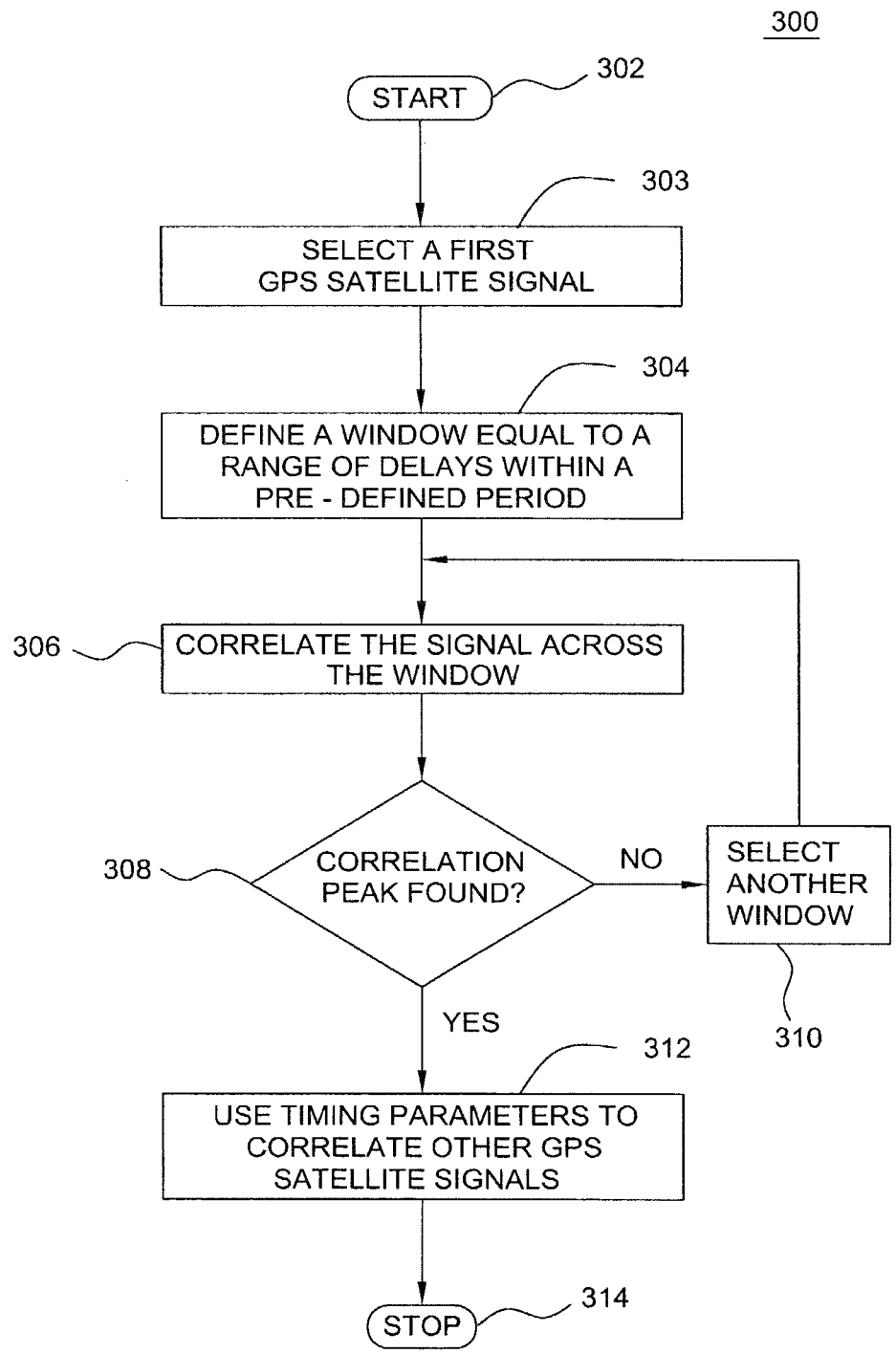
FIG. 3 depicts a flow diagram of an embodiment of the method used in accordance with the invention.

FIG. 3 depicts a flow diagram of software for implementing a correlation method 300 of the present invention. The method 300 begins at step 302, and proceeds to step 303 wherein the method 300 selects a first GPS satellite signal for processing, e.g., channel 208₁ is tuned to receive signals from a first satellite. At step 304, the method 300 defines a period of correlation ("window") equal to a range of delays within a predefined time period (i.e., a range of relative delays between the received satellite signal and the corresponding pseudorandom reference code). For a GPS signal, the predefined time period is one epoch of 1023 chips in length and the window is a portion of the epoch. For other digital signals, the predefined time period may other lengths of digital code. In one embodiment, the window is selected to be one-half of an epoch.

At step 306, the parallel correlators are used to correlate the received satellite signal across the window defined at step 304, wherein a PRN reference code is delayed by a half a chip in each correlator. As described above, there are 1023 correlators that correlate on half chip increments of the 1023 chips within the PRN code of the GPS signal. At step 308, the method 300 queries whether a correlation peak was found within the half epoch that was processed. If a high correlation peak was found, the method 300 proceeds to step 312, knowing that the PRN code needs to be delayed to a time within the half epoch. If the correlation peak is not found in step 308, then the method 300 proceeds to step 310, where another window within the predefined time period is selected (i.e., another range of delays). For example, the window selected at step 310 may be the second half of the epoch. The method 300 then proceeds to step 306, where the correlation is repeated for the newly selected window. In this manner, the PRN code phase delay or timing can be determined to within a half epoch without computing an accurate pseudorange to the first satellite.

At step 312, timing parameters are determined and used to correlate other GPS satellite signals. Notably, each processing channel 208₂ through 208ₙ will perform a correlation using the timing parameters of the first channel in combination with the aiding information. More specifically, the result of the first channel is used to bound the clock 250 in the GPS receiver, e.g., a delay range is known to be in the half epoch. The method 300 ends at step 314.

Although the above embodiment has been described with respect to a window equal to one half of an epoch, those skilled in the art will realize that other windows or range of delays may be used to perform correlation of a digital signal. For example, with a GPS epoch being 1023 chips long, if the correlation period were one fourth of an epoch, where 512 correlators were used in the correlation method of FIG. 3, then 512 correlations would be performed at most four times to identify which one fourth of an epoch the correlation occurs. As such the timing parameter, e.g., the local clock bias, would be found to an accuracy of within one fourth of an epoch. Other alternative techniques may be used to perform the timing estimation. Such procedures include using a half epoch correlation period that is staggered by one third of an epoch, using a period of one third of an epoch, and so on.

Figure 4A:
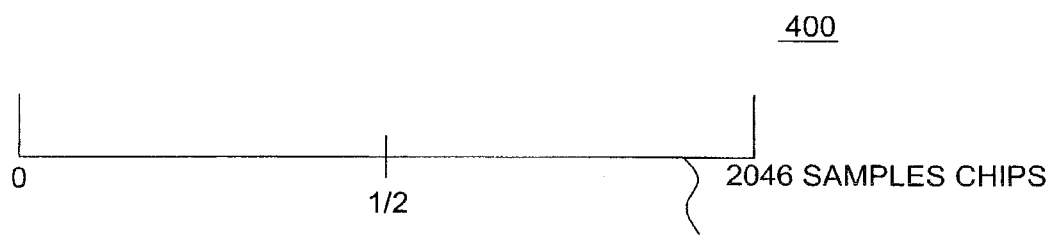
FIG. 4 depicts a graph of various signals processed by an embodiment of the present invention.
Figure 4B:
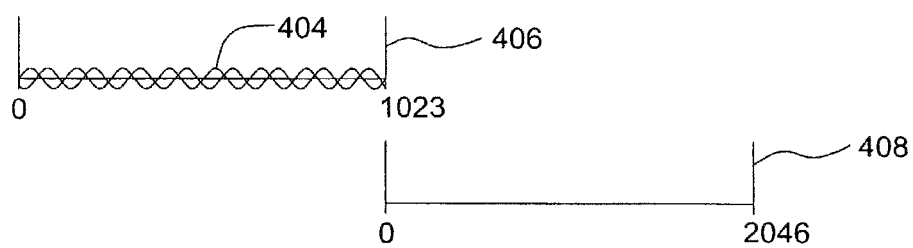
Figure 4C:
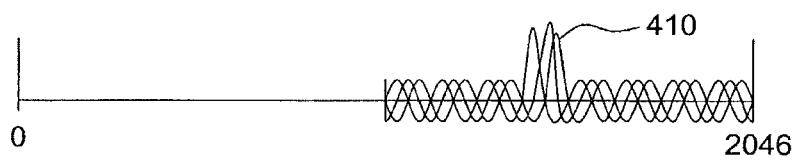
Figure 4D:

FIGS. 4A-4D graphically depict an exemplary process for performing signal correlation in accordance with the invention. FIG. 4A depicts a predefined period 402 having 2046 samples of 1023 PN code chips. FIG. 4B depicts two correlation periods 406 and 408 used to correlate in half epoch increments. In the present example, a correlation performed within the period 406 produces noise (i.e., a correlation is not present within the first half epoch). A shown in FIG. 4C, a correlation is then performed within the period 408 to produce a high correlation output (i.e., a correlation is present within the second half epoch). For example, a plurality of high correlation peaks 410 resulting from repeated correlations during the second half epoch of the signal are shown. Generally, the software as described above will integrate a number of correlation results to achieve an accurate correlation peak 412, as depicted in FIG. 4D. The peak 412 clearly shows that the PRN code phase is estimated to be within the second half epoch. As such, a timing parameter may be derived and used in combination with the aiding information to receive other GPS signals from other satellites. As such, signal acquisition may be performed without determining an accurate pseudorange to the satellite.

Although various embodiments, which incorporate the teachings of the present invention have been shown and described in detail herein, those skilled in the art can readily devise many other varied embodiments that still incorporate these teachings.

What is claimed is:

1. A method of correlating a digital communications signal from a satellite, comprising:
    (a) defining a window equal to a portion of an epoch of said digital communication signal, wherein the portion corresponds to one of a plurality of portions that span the entire epoch;
    (b) correlating said digital communication signal across said window;
    (c) identifying whether a correlation peak results from said correlating; and
    (d) establishing timing parameters for receiving additional digital communication signals from other satellites in response to presence of said correlation peak, wherein said establishing comprises establishing the timing parameters based on a location of the window within the epoch.

2. The method of claim 1, further comprising:
    (e) selecting another window within said epoch of said digital communication signal in response to absence of said correlation peak; and
    (f) repeating steps (b), (c), (d), and (e) until said correlation peak is found.

3. The method of claim 1, wherein said window is a half of said epoch.

4. The method of claim 1, wherein said window is a quarter of said epoch.

5. The method of claim 1, wherein said window is a third of said epoch.

6. The method of claim 1, wherein the digital communication signal is a GPS satellite signal.

7. The method of claim 1, wherein the digital communication signal is a GPS satellite signal transmitted from the satellite, and the timing parameters are set in a second receiver channel used to receive a GPS satellite signal from one of the other satellites.

8. The method of claim 1, wherein said defining step comprises: dividing said epoch into the plurality of portions; and selecting said portion from the plurality of portions.

9. The method of claim 1, wherein the timing parameters include a local clock bias.

10. The method of claim 9, wherein the local clock bias is determined to an accuracy of within a time duration of the window.

11. A method of establishing timing synchronization in a GPS receiver, comprising:
    (a) receiving a GPS signal from a first GPS satellite, where the GPS signal repeats over a predefined time period;
    (b) defining a window equal to a portion of the predefined time period, wherein the portion corresponds to one of a plurality of portions that span the entire predefined time period;
    (c) correlating said GPS signal across said window;
    (d) identifying whether a correlation peak results from said correlating; and
    (e) establishing timing parameters for receiving additional GPS signals transmitted by other GPS satellites in response to presence of said correlation peak, wherein said establishing comprises establishing the timing parameters based on a location of the window within the predefined time period.

12. The method of claim 11, wherein said predefined time period is one epoch of the GPS signal.

13. The method of claim 11, further comprising:
    (f) selecting another window within said predefined period of said GPS signal in response to absence of said correlation peak; and
    (g) repeating steps (c), (d), (e), and (f) until said correlation peak is found.

14. The method of claim 11, wherein said window is a half of the predefined time period.

15. The method of claim 11, wherein said window is a quarter of the predefined time period.

16. The method of claim 11, wherein said window is a third of the predefined time period.

17. A method of establishing timing synchronization in a multi-channel GPS receiver, comprising:
    (a) receiving a first GPS signal from a first GPS satellite using a first channel of the GPS receiver, where the first GPS signal repeats over a predefined time period;
    (b) defining a window equal to a half of the predefined time period;
    (c) correlating said first GPS signal across said window;
    (d) identifying whether a correlation peak results from said correlating; and
    (e) establishing timing parameters in a second channel of the GPS receiver for receiving a second GPS signal transmitted by a second GPS satellite in response to presence of said correlation peak, wherein said establishing comprises establishing the timing parameters based on a location of the window within the predefined time period.

18. The method of claim 17, further comprising:
(f) selecting another window equal to a second half of the predefined time period in response to absence of said correlation peak; and
(g) repeating steps (c), (d), (e), and (f) until said correlation peak is found.

19. An apparatus for correlating a digital communication signal from a satellite, comprising:
a correlator for correlating said digital communication signal across a window equal to a portion of a predefined period of said digital communication signal;
a microcontroller for identifying whether a correlation peak results from said correlating and for establishing timing parameters for receiving additional digital communication signals from other satellites in response to presence of said correlation peak, wherein the microcontroller establishes the timing parameters based on a location of the window within the predefined time period.

20. The apparatus of claim 19, wherein said correlator correlates said digital communication signal across another window within said predefined time period of said digital communication signal in response to absence of said correlation peak.

21. The apparatus of claim 19, wherein said digital communication signal is a GPS satellite signal transmitted from the satellite, and said timing parameters are set in a second receiver channel used to receive a GPS satellite signal from one of the other satellites.

\* \* \* \* \*

UNITED STATES PATENT AND TRADEMARK OFFICE
CERTIFICATE OF CORRECTION

PATENT NO. : 8,571,147 B2
APPLICATION NO. : 12/544600
DATED : October 29, 2013
INVENTOR(S) : van Diggelen et al.

It is certified that error appears in the above-identified patent and that said Letters Patent is hereby corrected as shown below:

In the Claims

Claim 1, Column 7, line 42, please replace "digital communications signal" with --digital communication signal--.

Signed and Sealed this
Thirty-first Day of December, 2013

Margaret A. Focarino
*Commissioner for Patents of the United States Patent and Trademark Office*